Figure 1:
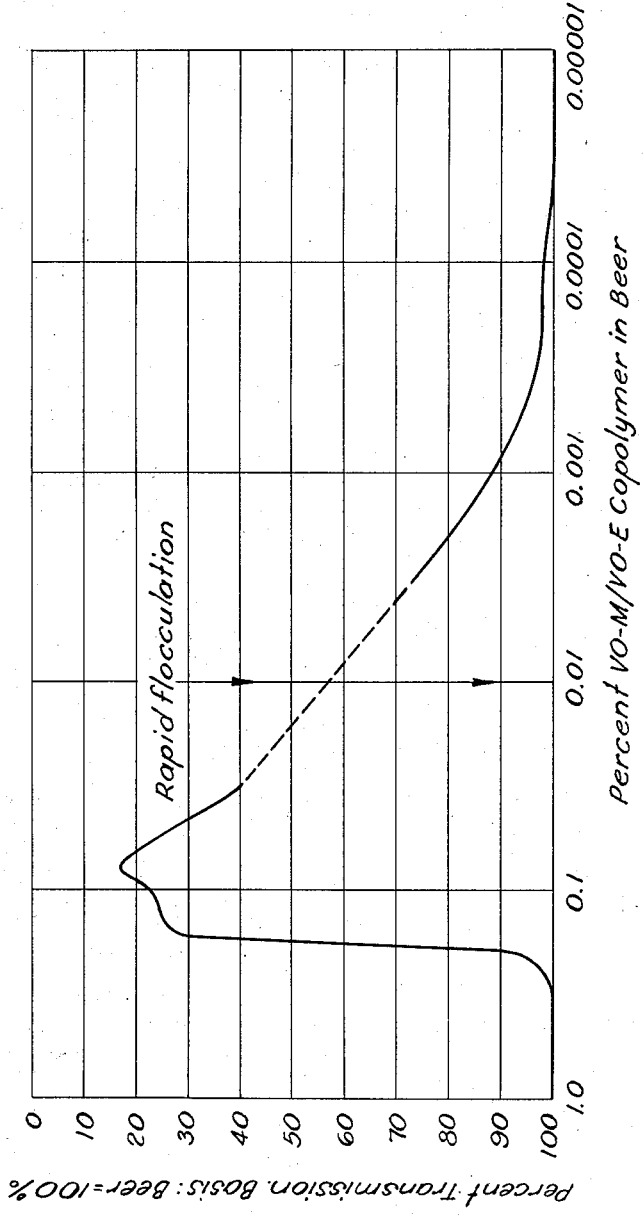

INVENTORS.
Wilhelm E. Walles
William F. Tousignant
ATTORNEY

United States Patent Office 2,872,322
Patented Feb. 3, 1959

2,872,322

CLARIFICATION OF BEVERAGES

Wilhelm E. Walles and William F. Tousignant, Midland, Mich., assignors to The Dow Chemical Company, Midland, Mich., a corporation of Delaware Application May 7, 1958, Serial No. 733,743

9 Claims. (Cl. 99—48)

The present invention relates to the treatment of various essentially clear or limpid beverages to materially improve their clarity and transparency or translucence and to render them stable against development of haze subsequent to treatment. The invention has particular reference to the low temperature clarification of many beverages. It is especially concerned with such treatment for the several alcoholic malt beverages and the like, including beer, ale, porter and so forth.

Many essentially clear liquid beverages, or beverages intended to be of an essentially clear or limpid character, are liable to be obtained in their as-manufactured state with some degree of haziness or cloudiness that persists despite filtration, or to develop such a condition upon standing or being chilled, or both. It is quite common, of course, for beverages to be stored, sometimes under refrigeration, after their manufacture. Besides, they are frequently chilled prior to consumption to enhance their palatableness. Such haziness, including "hazing on standing" and "chill haze," occurs frequently in the several essentially clear or limpid beverages, both non-alcoholic and alcoholic in nature, that are derived from various grains, fruits, berries and vegetables or mixtures thereof. Of course, most alcoholic beverages are prepared by fermentation processes and are often obtained as distilled or spirit fortified products. In addition, many beverages are often carbonated, either by natural or artificial means, and may often be artificially sweetened with sugar or other saccharine materials.

Hazing in essentially clear beverages is generally believed to be primarily caused by pectins and tannins and the like (whose solubilities may range from being completely insoluble to completely soluble substances and which may be colloidal or otherwise efficiently dispersible materials), as well as other dark colored soluble or partially soluble materials, that are obtained in the beverage during its manufacture. In some instances, proteinous constituents may also be responsible for the hazing phenomena in beverages. It has been proposed, for example, that a protein tannin complex in beer, which frequently contains traces of such heavy metals as copper and iron, is responsible for clouding, particularly chill hazing, of the beverage. Such complexes are also felt to be responsible for off-flavors in the beer because of their propensity to induce oxidation of some constituents of the beverage or due to organic reduced sulphur in the complex, or both. Insoluble constituents, including a large part or all of the completely insoluble pectins and tannins, can ordinarily be removed quite readily from a beverage by ordinary filtration procedures. Such physical treatment, however, does not accomplish removal of the soluble or efficiently dispersed pectins, tannins and other dark colored substances (which frequently are of high molecular weight and which may be relatively unstable in nature), including those in protein complexes, that engender the above-mentioned turbidity and hazing phenomena. Furthermore, the efficiently dispersible pectins, tannins and protein complexes may often be responsible for many difficulties in the filtration of the beverages.

While it is known to clarify various beverages, including malt beverages, through use of various agents, including water-soluble polymeric agents, that are more or less adapted to coagulate and precipitate the haze-producing ingredients in the beverage, the usual treatment is ordinarily accomplished at room temperature with a completely or substantially completely water-soluble coagulating material which is capable of remaining in normal aqueous solution at the temperature desired for treatment. In many cases, the heating of a beverage to temperatures in excess of chilling temperatures, such as those above about 15-20° C. or so, may have a deleterious consequence on the quality of the beverage being treated. This is often the case in carbonated beverages, and is particularly so for the various alcoholic malt beverages, such as beer, etc. Thus, when beer is heated substantially above about 15-20° C. and maintained for any significant period of time at such elevated temperature, it tends to lose its flavor. In addition, the heating may cause loss of dissolved carbon dioxide or other carbonating gas in beer and the like beverages and also provides opportunity for mold or bacterial growth to be engendered in the beverage being treated.

It would be advantageous, and it is the chief aim and concern of the present invention, to provide new and highly efficacious agents for the treatment of essentially clear beverages that would be capable of coagulating and precipitating therefrom the water soluble or otherwise efficiently dispersible colloidal pectins, tannins and other dark colored soluble and partially soluble or otherwise dispersible substances that are responsible for producing the hazing phenomena in the beverage. It would be a corollary advantage of commensurate magnitude, and it is the principal object of the present invention, to provide a process for the material clarification and stabilization against hazing of essentially clear beverages using the referred-to novel coagulating and precipitating agents. It would be particularly advantageous, and it is another object of the invention, to provide an agent and a process for beverage clarification capable of being used at desirably low, beverage chilling temperatures and also being capable of producing a treated beverage substantially or completely free of any residual treating agent. It would be additionally advantageous, and it is also an objective of the invention, to provide a coagulating and precipitating agent of the described type and a process for its utilization in the clarification of beverages that would possibilitate, along with the achievement of the primary end, many ancillary and cognate benefits and desiderations, as hereinafter more fully delineated.

It is to be fully understood, incidentally, that the operability and utility of the present invention is neither dependent upon nor to be evaluated in the light of an exact identification or characterization of the substances that cause hazing in beverages. The reference to them as including pectins, tannins and proteinous complexes is merely set forth upon the basis of reasonable information and belief. And, as is hereinafter demonstrated, such substances, regardless of their specific nature, are efficaciously coagulated and precipitated from beverages of the indicated type by use of the herein contemplated treating agents.

In accordance with the practice of the present invention whereby the above mentioned and hereinafter more specifically manifest objects, advantages and benefits may be achieved, essentially clear or limpid beverages may be advantageously treated for removal of pectins, tannins, protein complexes and dark colored soluble materials of naturally occurring origin in order to be clarified and rendered stable against hazing by a process which comprises adding to the beverage being treated, at a temperature beneath the "cloud" point of the hereinafter defined treating agent, a minor proportion of, say, between about 0.001 and 1.0 percent by weight and more advantageously from about 0.01 to about 0.1 or 0.2 percent, based on the weight of the beverage being treated, of a coagulating and precipitating agent for the haze and turbidity-inducing ingredients in the beverage that consists of a copolymer of N-vinyl-5-ethyl-2-oxazolidinone (VO–E) and N-vinyl-5-methyl-oxazolidinone (VO–M) of the general structure:

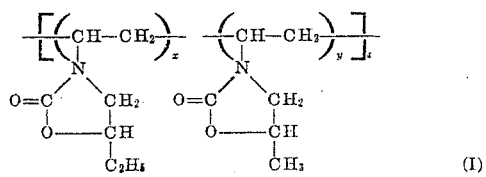

in which on a weight basis $z$ is equal to the sum of $x+y$ and the value of either $x$ or $y$ (and their relative proportion) is such that at least one weight percent of the copolymer consists of either the polymerized VO–E or VO–M monomer; warming the beverage being treated after addition of the copolymeric treating agent to a temperature above the "cloud" (or thermal coagulation) point of the polymer; then filtering the coagulated and precipitated turbidity-inducing ingredients, or otherwise physically separating and isolating them from the beverage, along with the precipitated copolymeric treating agent which is insoluble in the aqueous solution above its cloud point.

Advantageously, the value of $z$ in the copolymer of VO–E and VO–M that is employed is in excess of 50 and usually in excess of 100 or so. For brevity and convenience, the copolymeric treating agents are hereinafter referred to as P(VO–E/VO–M). Such term, both in the following specification and in the hereto appended claims, is intended to comprehend, as equivalents, copolymers prepared with isomers of either of the monomeric constituents. Thus, such isomers of VO–E as N-vinyl-4-ethyl-2 - oxazolidinone and N - vinyl - 4,5- - dimethyl - 2-oxazolidinone, or mixtures of either or both of them with one another or with N-vinyl-5-ethyl-2-oxazolidinone may be utilized as the VO–E constituent of the copolymer. Likewise, N-vinyl-4-methyl-2-oxazolidinone or mixtures thereof with N-vinyl-5-ethyl-2-oxazolidinone may be employed as the VO–M constituent of the copolymer.

The above indicated treating quantities of the P(VO–E/VO–M) are not absolute since, in certain cases, greater or lesser proportions of the agent may be suitable and effective to employ. Thus, any quantity of the agent that is in an amount which is adequate to materially precipitate the haze-inducing ingredients from a given beverage may be utilized for the practice of the invention. After addition of the P(VO–E/VO–M) the treated beverage may be warmed to any desired moderate temperature although, especially in the case of malt beverages, it may be preferable to maintain it at temperatures beneath about 15–20° C. or so. After the haze-inducing ingredients and the precipitated P(VO–E/VO–M) have been isolated from the clarified beverage, the product may be rechilled for storage and handling at any desired lower temperature or, if desired, may be permitted to remain at the higher temperature. Ordinarily, about 40° C. is usually as high an upper limit of temperature as may be desired for warming the beverage during the precipitation and filtration or other solids-isolating step.

The treatment can be performed by directly adding the P(VO–E/VO–M) copolymeric treating agent to the beverage at a temperature beneath the cloud point of the copolymer at which temperature the agent is soluble in aqueous media. Following addition of the P(VO–E/VO–M) treating agent, the beverage is warmed above the cloud point of the copolymer to facilitate the desired coagulation and precipitation of the pectins, tannins, complexes and other dark colored soluble ingredients to occur, along with precipitation of the P(VO–E/VO–M) which is insoluble in aqueous media above its cloud point. This is followed by removal of the precipitate and recovery of the clarified beverage. After this, as indicated, the beverage may be rechilled, if so desired. The P(VO–E/VO–M) may, of course, be added in the form of a cold water solution or other aqueous dispersion (preferably as a relatively concentrated composition in the liquid vehicle) to the beverage being treated. It is not necessary in all instances for the P(VO–E/VO–M) to be added to the beverage while the latter is at a temperature beneath the cloud point of the P(VO–E/VO–M), so long as the necessary chilling to solubilize the coagulating and precipitating agent is accomplished after addition of the P(VO–E/VO–M) has been made to the beverage being treated.

The beverage may be treated at any convenient point in its manufacture or processing adapted to provide or accommodate the manipulative conditions of the present process. Thus, as indicated, the treatment may be accomplished when the beverage is suitably cold to be beneath the cloud point of the P(VO–E/VO–M) or at some point prior to chilling when the beverage is not actually cold enough to dissolve the P(VO–E/VO–M). With beer, or other malt beverages, for example, the treatment may be made when the beverage is being racked down from the fermentors or when the beer is commencing its storage in the cold cellars, especially if storage is performed at temperatures beneath the cloud point of the agent. The agent can even be added to the beer while it is in the mashing stage of its manufacture. In such instances, however, relatively greater quantities of the agent may be required for optimum results.

If desired, the beverage may be agitated or stored during addition of the copolymeric agent or shortly thereafter, or both, in order to ensure a quick and thorough admixture of the coagulating and precipitating agent with the beverage being treated. This may be especially desirable when the beverage is being warmed after addition of the P(VO–E/VO–M) to a temperature above the cloud point of the copolymer. While stirring is not an absolute necessity, it may be resorted to for purposes of expediting the processing of large volumes of the beverage, especially when the treatment is made with batch quantities. As is apparent, the P(VO–E/VO–M) may also be continuously added to a flowing cold stream of the beverage being treated which is at a temperature beneath the cloud point of the polymer, in which case the turbulence of the moving liquid usually produces an intimate incorporation of the agent therein. Of course, the P(VO–E/VO–M) can be added to a flowing stream of the beverage at a temperature above the cloud point of the copolymer if the beverage is chilled after addition of the agent to a solubilizing temperature beneath the cloud point of the P(VO–E/VO–M) prior to rewarming of the polymer-containing beverage for coagulation and precipitation.

Ordinarily, the P(VO–E/O–M) effects coagulation and precipitation in the beverage of the normally non-filterable pectins, tannins, complexes and other haze-inducing ingredients in a practically instantaneous manner. After warming of the beverage to a temperature above the cloud point of the polymeric agent any uncomplexed polymer is also assured of being removed from the treated beverage. It is seldom that more than an hour is required for treating purposes. Generally, only several minutes—usually less than ten—are all that are necessary for the desired result. The precipitate that forms which, especially at temperatures above the cloud point of the polymer is comprised of P(VO–E/VO–M)

complexes and the then water-insoluble copolymer itself, generally settles very rapidly from the beverage and is usually quite flocculent in nature. More often, the precipitate is found to consist of relatively large size particles.

After the coagulation and precipitation of the haze-inducing ingredients has been accomplished, the precipitate may be isolated or removed and the clarified beverage recovered by settling and decantation or siphoning operations or by filtration of the treated beverage. If preferred, filtration may be facilitated by utilization, in the conventional manner, of such filter aids as diatomaceous earth, cellulosic filter aids and the like or their equivalent. Because the treatment of the present invention produces good precipitation of haze-inducing ingredients from substantially all essentially clear beverages to yield a generally relatively clear supernatant, rapid filtration or other liquid separation is greatly facilitated with minimized problems of apparatus maintenance, such as filter cleaning.

The P(VO–E/VO–M) copolymer coagulating and precipitating agents used in the practice of the present invention have a pronounced ability to clarify the beverages being treated and to stabilize them in a substantially permanent manner against hazing, even upon being chilled for prolonged periods of time. Frequently, the beverage is made remarkably pellucid and transparent by treatment with the P(VO–E/VO–M) copolymer. In addition, the taste of many beverages oftentimes appears to actually be improved and appreciably augmented by the treatment. Besides, many spumous or foamy beverages, such as beer and the like, are additionally ameliorated by the present treatment in having their head of foam (as produced upon pouring) improved in its general physical characteristics including thickness, appearance and life. Besides, the foam forming ability of a treated spumous beverage, such as beer, is usually also enhanced by practice of the present invention.

None of the P(VO–E/VO–M) copolymers that may be employed produce deleterious influences or intolerable toxicological effects or other undesirable occurrences in the beverage being treated. Advantageously, the normally solid polymer that is utilized as a coagulating and precipitating agent for the present purposes is a high polymer having a Fikentscher K-value of at least about 5. More advantageously, the P(VO–E/VO–M) copolymer employed has a Fikentscher K-value between about 10 and 100. Most advantageously, its K-value is from about 10 or 15 to 75. The Fikentscher K-value of a polymeric substance is a quantity, as has been defined by Fikentscher in Cellulosechemie, 13, 60 (1932), that represents an approximate measure of the weight fraction of a given sample of polymer in an infinitesimal molecular weight range. According to a concept that is widely acceptable to those skilled in the art, it may be said to be in correlation, in an exponential manner, to the mean average molecular weight that obtains in a given sample of a polymer substance.

The Fikentscher K-value of a water-soluble polymer may be determined according to the equation:

$$\log Z = \frac{0.000075 K^2}{1 + 0.0015 K} + 0.001 K \quad (1)$$

wherein K is the Fikentscher K-value and Z is the relative viscosity at any chosen temperature which is obtained as the quotient of the viscosity of the polymer solution at a given concentration "c" (which, advantageously, is constant at 1 percent by weight of dissolved polymer in the solvent) divided by the viscosity of the solvent. Equation 1 is derived from the following equation wherein $1000\ k = K$:

$$\log Z = \left(\frac{75 k^2}{1 + 1.5 kc} + k\right) c \quad (2)$$

wherein c, as indicated, is the concentration of the polymer in solution expressed in grams per 100 ml. Equation 2 is derived from Fikentscher's original equation:

$$\log Z = \left(\frac{ak^2}{1 + 1 bkc} + k\right) c \quad (3)$$

wherein a and b are constants which have numerical values of 75 and 1.5, respectively, regardless of the polymer used or of concentration or of other factors involved. As a practical matter, the Fikentscher K-value is oftentimes determined by solution for K of Equation 1. Other procedures for determining K-value which provide values equivalent to those obtainable with the above equations are described in U. S. 2,811,449.

Figure 2:
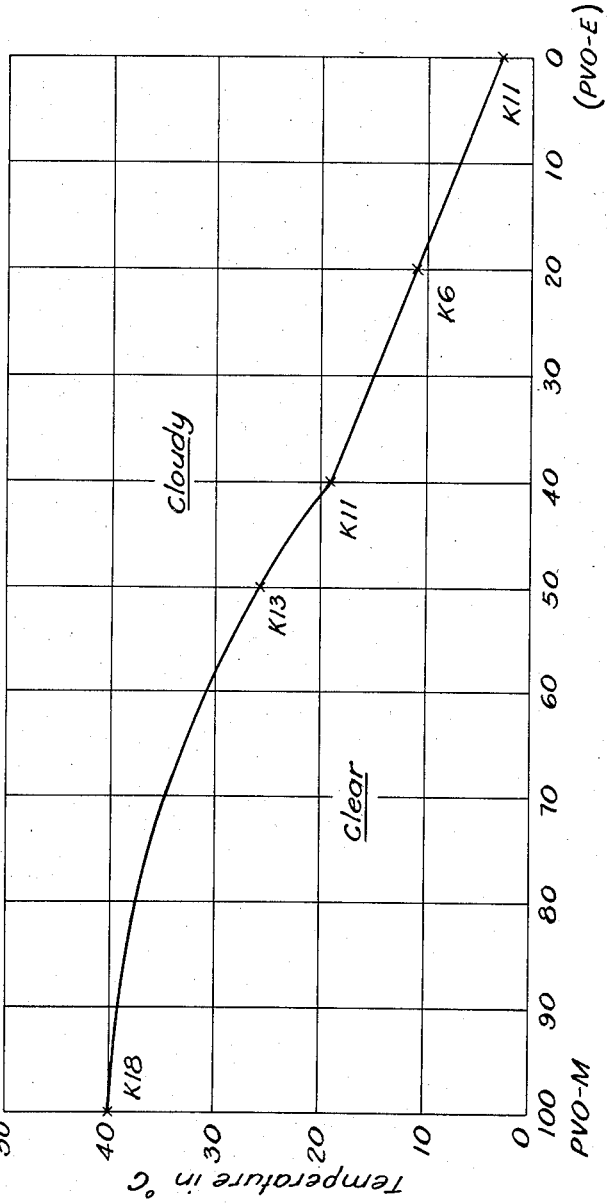

The P(VO–E/VO–M) copolymer treating agents that are utilized in the practice of the present invention are water-soluble polymers at temperatures beneath their cloud point in aqueous media. The cloud point of any particular copolymer, as indicated in Figure 2 of the accompanying drawing, is intermediate between that of poly-N-vinyl-5-ethyl-2-oxazolidinone and poly-N-vinyl-5-methyl-2-oxazolidinone, and depends upon the particular constitution of the copolymer involved. Thus, as indicated in the foregoing, the high polymer forms of P(VO–E/VO–M) are generally insoluble in water at temperatures above their cloud points. While the polymer can be dissolved in water at a temperature beneath its cloud point, it comes out of solution by means of thermal coagulation upon warming of the aqueous solution to temperatures above its cloud point. At such higher temperatures, the P(VO–E/VO–M) copolymer generally precipitates from the solvent vehicle and is found to be insoluble for all practical intents therein.

As has been indicated, any essentially clear or limpid beverage, or one intended to be of such character, may be benefited by treatment in accordance with the present invention. Typical of such beverages there may be mentioned beer, ale, porter, the various grape and other fruit or berry wines, champagne, sake, tequila, brandy, whisky, gin, vodka, cider (sweet or hard), such unfermented fruit juices as apple juice, grape juice, prune juice and the like, cranberry juice and other clear berry juices, sweet or so-called "soft" drinks (both carbonated and non-carbonated, either before or after carbonation) and other similar beverages that are desired to be obtained and used in a transparent or translucent, free or substantially free from haze condition.

To illustrate specific treatments that may be accomplished in the practice of the invention, apple juice may be advantageously clarified and stabilized against hazing with between about 0.001 and 0.2 percent by weight, based on the weight of the juice, of the P(VO–E/VO–M) copolymer agent. Preferably at least about 0.003 percent of the agent is used for clarifying apple juice. Beer and wine are effectively enhanced with from 0.001 to 0.1 percent or so of the agent, preferably about 0.005 or so percent. For treatment of beer, this is in the range of from one-quarter to twenty-five pounds of the treating agent per hundred barrels (twenty-five thousand pounds) of beer. Frequently it is more desirable and economical to use from one-half to two pounds, more advantageously about one pound, of the agent per hundred barrels of beer. In the case of most wines and other tannic acid-containing beverages, an optimum quantity of the agent to use is frequently an amount that is about equal on a weight basis to the amount of tannic acid in the beverage. As will be readily appreciated, however, specific requirements may oftentimes be found to vary with particular beers, wines or other beverages being treated. Prune and grape juice are beneficially treated about the same way as apple juice.

In order to further illustrate the invention, the following examples, not intended to be limiting or restrictive are given wherein all parts and percentages are to be taken on a weight basis.

Example A

Into a one liter resin flask equipped with a reflux condenser, magnetic stirrer, nitrogen inlet, thermometer and infra-red heating temperature control unit, there was charged about 50 grams of essentially pure N-vinyl-5-ethyl-2-oxazolidinone (M. W. 128–99.3 percent pure); 50 grams of essentially pure N-vinyl-5-methyl-2-oxazolidinone (M. W. 114–99.6 percent pure); 1 gram of $\alpha,\alpha'$-azobisisobutyronitrile; and 500 grams of dry denatured ethanol. The contents of the flask were stirred constantly and heated under reflux (78° C.) for 10 hours. After this time the reaction was terminated. At least 98 percent conversion of monomers to copolymer product was achieved. The resulting solution was clear, colorless and syrupy. The P(VO–E/VO–M) copolymeric product, which contained about equal respective weight proportions of the polymerized monomers, was isolated by slowly pouring the reaction mass into about 2 liters of dry diethyl ether, whereupon the copolymer precipitated as a white powder having a density of about 1.237 grams per cubic centimeter (after having been dried in vacuum for purification). Its K-value was about 13.

The P(VO–E/VO–M) copolymer product had a molecular weight of about 13,000 and a coagulation (i. e., "cloud") point in water of about 26° C. It was readily soluble in water at any temperature beneath its cloud point and was also completely soluble in water, alcohols such as ethanol, methanol, propanol, etc.

The foregoing general procedure was duplicated several times, using varied proportions of the monomeric ingredients, to obtain P(VO–E/VO–M) copolymer products containing from 1 to 99 percent of polymerized VO–E. Similar results may also be obtained when the foregoing procedure is essentially duplicated, excepting to replace either the VO–E or VO–M monomers with their isomers or to use mixtures of any of the indicated varieties of isomers.

Example B

A series of physical mixtures (or polymer blends) of poly - N - vinyl - 5 - ethyl - 2 - oxazolidinone (PVO–E) and poly-N-vinyl-5-methyl-2-oxazolidinone (PVO–M) was prepared using homopolymers having K-values between about 20 and 30. When attempted to be dissolved in water at room temperature to obtain solutions having about 5 percent total dissolved solids, the resulting compositions showed the general insolubility and characteristic cloud point of PVO–E above about 3–4° C. Thus, only the PVO–M dissolved from the physical mixture until the composition was chilled to below about 4° C., whereupon the PVO–E also went into the aqueous solution.

In contrast, a series of P(VO–E/VO–M) copolymers were prepared containing varying proportions of VO–E polymerized in the polymer molecule. When the copolymer products were dissolved in ice water (i. e., less than about 4° C.) to make 5 percent solutions and heated, it was observed that the cloud point underwent a significant rise within increasing amounts of VO–M in the copolymer. Thus, in a copolymer containing 20 percent VO–M, the cloud point was about 11° C.; with about 40 percent VO–M, it was about 19° C. The results of these data are graphically illustrated by the curve in Figure 2 of the accompanying drawing, wherein the K-values of the various copolymers made and tested are also indicated.

Example C

To 100 ml. of a commercially obtained bottle beer (Carlings "Black Label") having an alcohol content of about 3.5 percent there was added 1 ml. of a 2 percent aqueous solution of P(VO–E/VO–M) having a Fikentscher K-value of about 11 and containing about 40 percent of polymerized VO–M in the copolymer molecule. Prior to treatment, the beer was cooled to about 15° C. and maintained at this temperature during the experiment. The aqueous solution of the copolymer added to the beer was at a temperature of about 15° C. Upon addition of the P(VO–E/VO–M) to the beer, a cloudiness become immediately apparent in the treated beverage. This was the result of a complex formed by the polymer and the haze-inducing ingredients in the beverage. Thus, even without benefit of thermal coagulation of the P(VO–E/VO–M), the haze-inducing ingredients of the beverage were affected by the copolymer.

Example D

The procedure of the foregoing example was repeated excepting to employ two samples of the beer and to add only 0.1 ml. of the cold P(VO–E/VO–M) solution to each beer sample. Thus, the concentration of the polymer in each of the samples was about 0.002 percent. One of the samples was maintained at 15° C. for an hour. The other was warmed to about 20° C. The warmed sample was appreciably more cloudy than the sample that was permitted to remain at 15° C. After an hour, the warmer sample was observed to have a fine and distinct precipitation deposited on the bottom of the vessel in which it was contained. The unwarmed sample, which was retained at 15° C., remained cloudy all over without any noticeable collection of precipitate at its bottom. Each of the samples was then filtered through filter paper while being maintained at the temperature of the treatment. The warmer sample ran through the paper rapidly to yield a perfectly clear beer. Filtration of the sample that had been maintained chilled at 15° C. was much slower and the filtered product was noticeably less clear than that from the warmed sample. From the foregoing, the advantage of thermally coagulating the added P(VO–E/VO–M) in order to obtain a coarse precipitate which can be readily removed from the beer or other beverage being treated is readily apparent.

Similar results may be obtained with other copolymers of VO–E and VO–M having different cloud points using temperature conditions during the treatment in accordance with and to take advantage of the particular cloud point of the copolymer employed.

Substantially identical results are additionally obtained with both raw and finished beer treated in a commercial brewery with 0.005 percent of the same P(VO–E/VO–M). The treated beverages are rendered chill proof at actual beer temperatures as low as their freezing points and to remain haze free upon being returned to room temperature after the treatment. The same remarkable benefit was be obtained using other of the presently contemplated P(VO–E/VO–M) copolymers as treating agents.

Example E

In order to indicate the correlation between concentration of P(VO–E/VO–M) coagulating and precipitating agent and cloudiness of the treated beverage product, the general procedure of the foregoing example is repeated with varying concentrations of the same copolymeric agent in beer. In order to illustrate the effect on a quantative basis, the percentage of light transmission of each sample, as compared to an identically contained volume of untreated beer, is spectrophotometrically determined using light from a standard tungsten filament bulb source that is passed through a blue light filter effective in the 425 millimicron range. The apparatus employed is a Fisher Nefluoro-Photometer. The results are graphically depicted in the Figure 1 of the accompanying drawing. The improvement achieved through the use of optimum quantities of P(VO–E/VO–M) within the indicated ranges in the practice of the present invention is obvious upon analysis of the therein contained data, in which greater transmission percentages are proportional to and representative of greater clarity. The dotted portion of the curve indicates most rapid flocculation of the haze-inducing ingredients from the beer and optimum precipitate forming conditions for most efficient filtration.

*Example F*

To indicate the probable character or nature of the ingredients that are coagulated and precipitated from beverages by the P(VO–E/VO–M) copolymers, a series of aqueous solutions of various natural products and chemicals is treated with minor proportions of the same copolymer as employed in Example C to observe whether or not precipitation occurs. The liquids treated and the results obtained are set forth in the following tabulation, wherein the symbol "X" indicates formation of a precipitate and a blank space indicates no result.

| Aqueous Liquid Treated | Precipitating Effect |
|---|---|
| Bacteria Suspensions: | |
| Yeast Suspension | |
| Staphylococci Suspension | |
| Cow Stomach Rumen | |
| Proteins: | |
| Egg Albumin | |
| Beef Broth | |
| Beef Heart Extract | |
| Agar Agar | X |
| Peptone | |
| Amino Acids: | |
| N-Acetyl Phenyl Glycine | |
| Hydrolyzed Vegetable Protein | X |
| Carbohydrates—Gums: | |
| Soluble Starch | |
| Xylose | |
| Xylane | |
| Sodium Carboxymethylcellulose | |
| Ghatti Gum | |
| Beverages: | |
| Tea | X |
| Strawberry Juice | X |
| Apple Juice | X |
| Wine | X |
| Beer | X |
| Grape Juice | X |
| Chemicals: | |
| Lactic Acid | |
| Citric Acid | |
| Tartaric Acid | |
| Tannic Acid | |
| Indole-3-Acetic Acid | X |
| Indole-3-Propionic Acid | X |
| Indole Butyric Acid | X |
| n-Caprylic Acid (in 50 per cent ethanol) | |
| Miscellaneous: | |
| Pectin | X |
| Saponin | X |

Excellent results similar to those obtained in the foregoing are achieved when the present invention is practiced by substantial duplication of the above experiments with such beverages as unfermented apple juice (canned or fresh), wine, grape juice, prune juice and other of the essentially clear and limpid beverages indicated in the foregoing specification and description.

What is claimed is:

1. Process for treating essentially clear beverages to materially clarify them and render them stabilized against hazing, which process comprises adding to the beverage being treated, at a temperature beneath the cloud point of the polymeric treating agent, a minor proportion of between about 0.0001 and 1 percent by weight, based on the weight of the beverage, of a copolymer of N-vinyl-5-ethyl-2-oxazolidinone and N-vinyl-5-methyl-2-oxazolidinone that contains at least about 1 weight percent, based on the weight of the copolymer, of either monomeric ingredient, as a coagulating and precipitating agent for haze-inducing ingredients in the beverage; warming the beverage containing said copolymer to a temperature above the cloud point of said copolymer in aqueous solution, whereupon the haze-inducing ingredients are coagulated and precipitated from said beverage along with said copolymer; then physically separating the coagulated and precipitated materials from the clarified beverage product.

2. The process of claim 1, wherein said copolymer contains between about 60 and 80 weight percent of polymerized N-vinyl-5-ethyl-2-oxazolidinone, and wherein said copolymer is added to said beverage at a temperature, proportional to the cloud point of said copolymer, beneath about 11–19° C.

3. The process of claim 1, wherein between about 0.001 and 0.02 percent of said copolymer is added to said beverage.

4. The process of claim 1, wherein said copolymer has a Fikentscher K-value between about 10 and 75.

5. The process of claim 1, wherein said beverage is a malt beverage.

6. The process of claim 1, wherein said beverage is beer.

7. The process of claim 1, wherein said beverage is an unfermented fruit juice.

8. The process of claim 1, wherein said beverage is a wine.

9. The process of claim 1, wherein said coagulated and precipitated materials are removed from said clarified beverage by filtering.

No references cited.